April 1, 1969          L. A. IMHOFF          3,435,907
VEHICLES FOR TRAVELLING OVER VARIOUS TYPES OF TERRAIN
Filed Jan. 12, 1967          Sheet 1 of 3
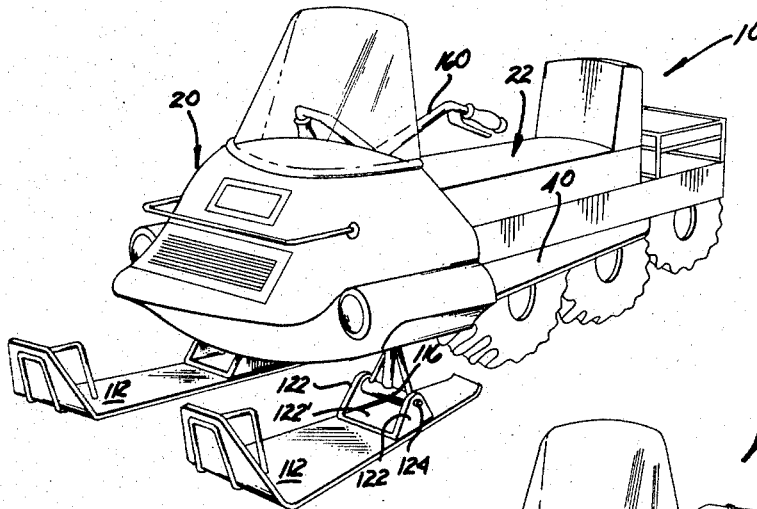
FIG. 1.
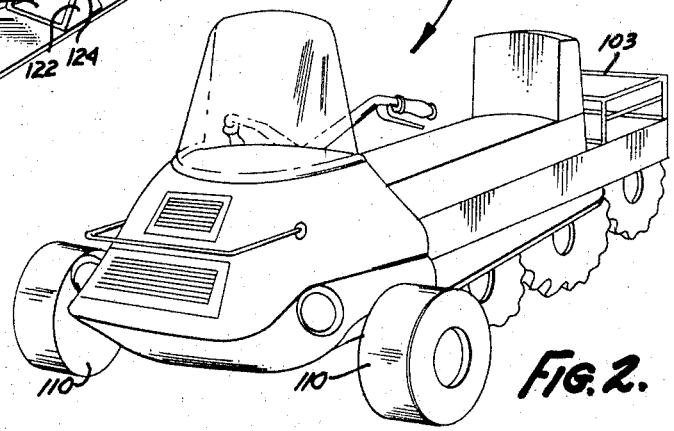
FIG. 2.
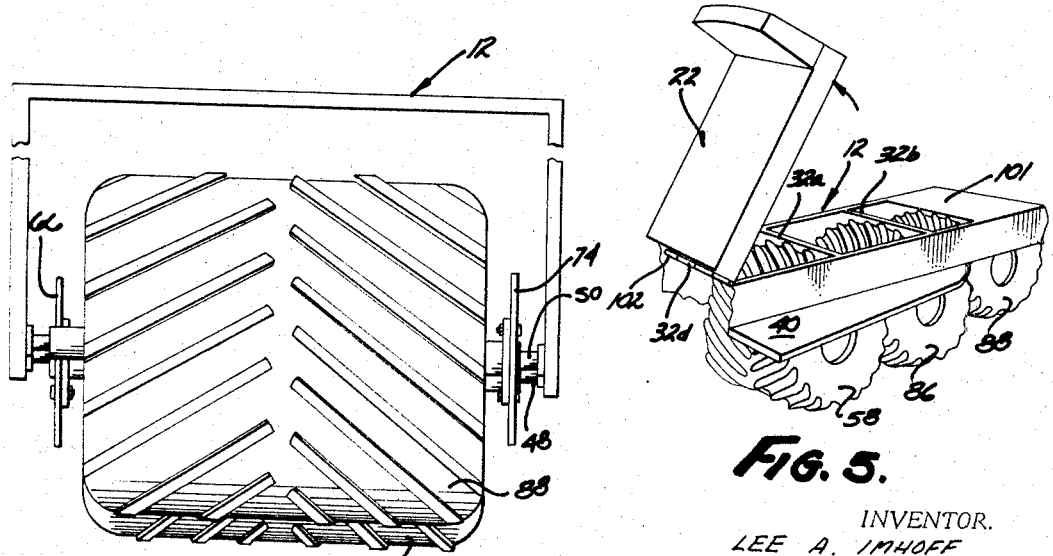
FIG. 4.
FIG. 5.
INVENTOR.
LEE A. IMHOFF
BY
ATTORNEYS April 1, 1969
L. A. IMHOFF
3,435,907
VEHICLES FOR TRAVELLING OVER VARIOUS TYPES OF TERRAIN
Filed Jan. 12, 1967
Sheet 2 of 3
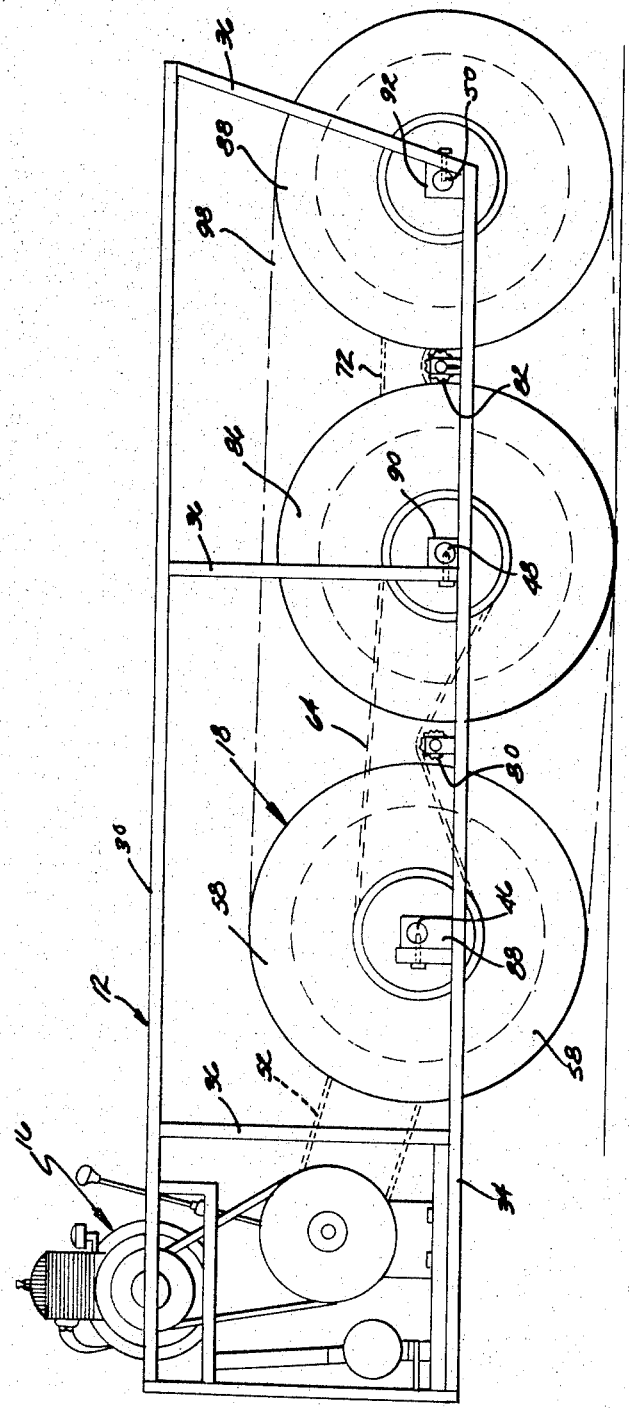
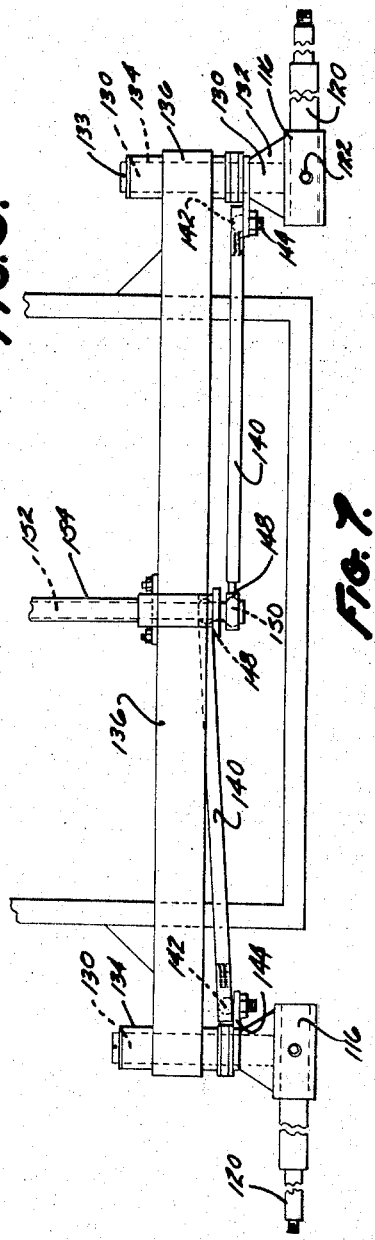
INVENTOR.
LEE A. IMHOFF
BY
ATTORNEYS

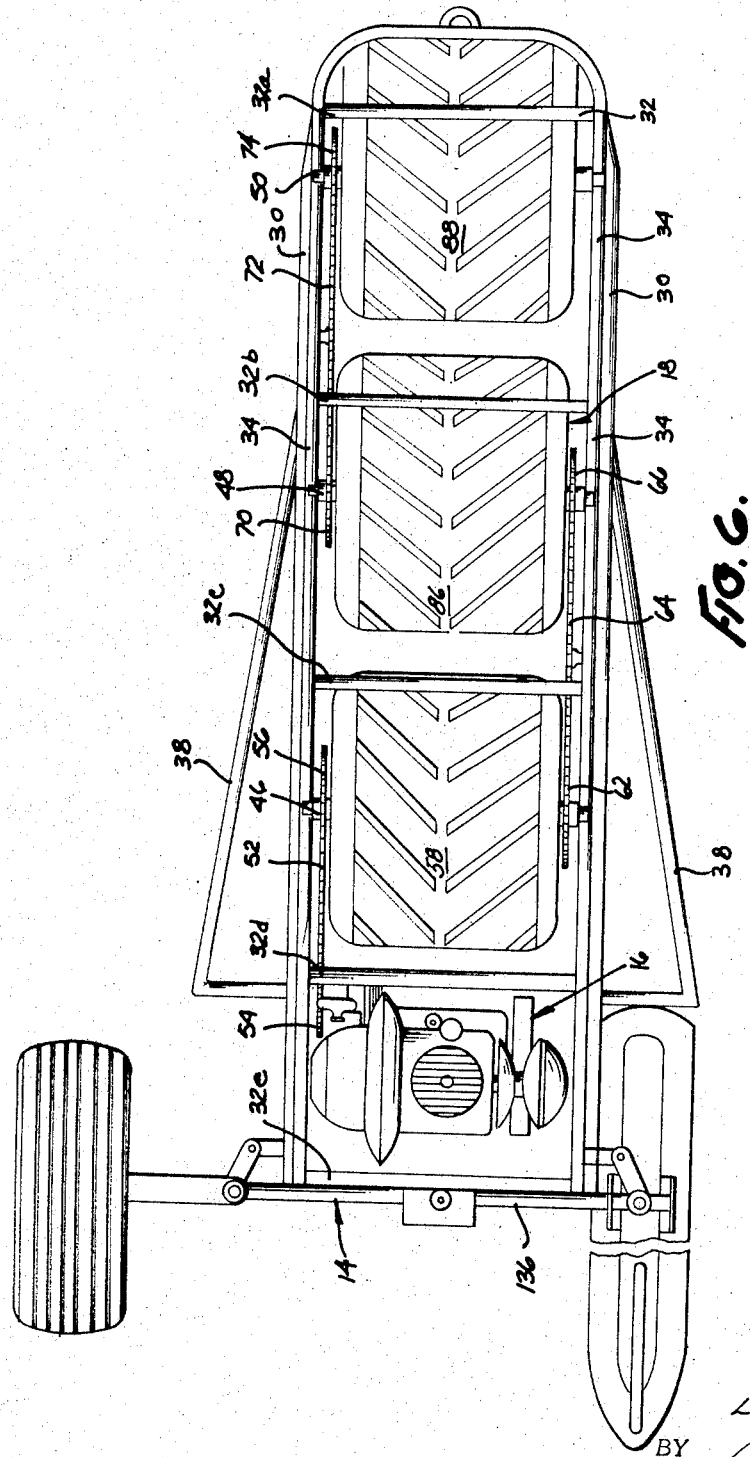

////United States Patent Office////3,435,907
Patented Apr. 1, 1969

3,435,907
VEHICLES FOR TRAVELLING OVER VARIOUS TYPES OF TERRAIN
Lee A. Imhoff, Lakeview, Mich., assignor to New Frontier Corporation, Grand Rapids, Mich., a corporation of Michigan
Filed Jan. 12, 1967, Ser. No. 608,832
Int. Cl. B62m 27/02
U.S. Cl. 180—5                                                5 Claims

ABSTRACT OF THE DISCLOSURE

A vehicle with steerable front wheels or runners and tandem axle rear support and propulsion means including at least three tandem axle and wheel units, the front most one having its lower portion slightly above the second one, and its rear, and preferably the rear most of three being also elevated slightly above the second one. The vehicle also has a novel snow removal access construction and a novel interchangeable ski and wheel feature on the front end.

This invention relates to a surface vehicle capable of traversing surfaces of various characteristics, and more particularly relates to a novel three-wheel cross-country vehicle particularly suitable as a pleasure vehicle and capable of traversing surfaces of varying roughness and consistency.

A variety of cross-country type vehicles have been developed in the past few decades, in response to military demands or leisure time desires. The most common type of such vehicles employs one or more cleat tracks for support and propulsion, while some employ a plurality of pairs of wheels on opposite sides of the vehicle in tandem axle relationship. Tandem axle and track type assemblies have in common a pair of interrelated problems, that is, difficulty of steering and rapid equipment wear.

Since the most versatile of these two types of vehicles is the track type, these problems will be described specifically with respect to it. In pleasure vehicles, usually one track is employed and is mounted toward the rear of the vehicle as propulsion and support means, while a turning wheel or ski means is mounted at the front. In order to turn such vehicles when riding over surfaces of soft characteristics, e.g. snow, mud, or sand, tremendous physical effort is necessary as is commonly known, since a greater share of the track must slide laterally about a portion of it. In fact, these vehicles are almost physically impossible to turn unless the rider or riders lean significantly in the direction of turning, to place the vehicle on the side edge of the track and thereby lift most of the track surface off the traversed surface. Moreover, when turning on a hard surface, this sliding action causes such severe wear problems that manufacturers of these units frequently mount the rear track portion in a vertical shiftable fashion to relieve some of the stress. Further, for those used for traversing hard dry surfaces, the vehicle front end has to be elevated sufficiently so that only the rear end of the track will engage the hard surface. Otherwise, the wear is extremely severe, and steering is practically impossible. This latter technique does considerably lessen the turning effort required, but still involves rapid track wear due to high local stresses on the contacting rear portion of the track. Consequently, practically constant repairs are necessary on present equipment, sometimes as frequently as weekly. Moreover, similar lateral sliding characteristics are exhibited by the tandem wheel type assemblies, causing difficult steering and rapid wear.

The lateral stress forces on these vehicles is so substantial that the inverted U-shaped elongated frames commonly employed have the depending side legs thereof progressively spread further and further into a deformed weakened structure.

Another serious problem of these prior vehicles is the tendency for the propulsion means such as the tracks to carry snow and debris up from the surface and pack it between the top of the propulsion means and the underside of the vehicle. This packed snow tends to melt slightly due to vehicle heat, particularly when the vehicle is stationary, and then subsequently freezes solid. This frequently partially or totally disables the vehicle. Previous vehicle constructions have caused removal of this packed snow and/or mud and ice to be extremely difficult. Normally the vehicle must be tipped upon its side so that the ice can be gouged out from the bottom.

*Summary*

It is an object of this invention to provide a vehicle having the capacity to traverse surfaces of varying roughness and varying consistency, including mud, snow, sand, hard surfaces, or the like, having excellent traction and mobility even under these conditions, and yet having steering characteristics allowing easy turning and manipulation of the vehicle with constant complete control.

Another object of this invention is to provide a surface traversing vehicle of a tandem axle type which enables the vehicle to be turned easily without requiring the rider or riders to lean sufficiently to tip the vehicle on edge temporarily during turning.

Another object of this invention is to provide surface traversing vehicles that have a tandam support propulsion arrangement providing optimum support and propulsion characteristics, yet which enables turning either in soft consistency surface material or on a hard surface, without significant lateral sliding of the driving components to cause rapid wear of the equipment and difficult steering.

Another object of this invention is to provide a surface traversing vehicle having unique tandem wheel arrangement enabling optimum drive and support relationships, while also minimizing wear on the equipment, and which also enables simple change-over from skis to wheels on the front end of the vehicle without having to tilt the vehicle up in the front and down in the rear for minimum surface contact by the propulsion means. Rather, the arrangement of the drive units themselves causes them to automatically provide maximum support and surface contacting area for soft surfaces, and minimum surface contacting area on hard surfaces.

Another object of this invention is to provide a surface vehicle having the capacity of being readily cleaned of snow, mud, and ice which tends to pack between the top of the propulsion means and the underside of the vehicle.

Another object of this invention is to provide a surface vehicle having a tandem drive assembly which normally includes a plurality of wheels, one behind the other, for traversing all types of surfaces, and being capable of receiving a track on the wheels for traversing very deep powder snow. Moreover, even with the belt or track attached, the vehicle is still subject to easy steering and control both on hard and soft surfaces, and without serious belt wear. The belt is not required to arc around small diameter pulleys of about 7″ or so as is conventionally required, but rather can pass around the entire wheel periphery for minimum belt wear and stress.

Another object of this invention is to provide a novel surface vehicle wherein the axle assemblies themselves serve as part of the support framework to provide extra reinforcement.

These and other objects of this invention will become apparent upon studying the following specification in conjunction with the drawings.

Briefly, the invention, which is defined by the claims and not by this paragraph, includes the main feature of the novel vehicle is in putting in combination with front end contact and steering mechanism, tandem axle support and propulsion means that includes three in-line enlarged wheels with axles, with or without a track therearound, arranged such that the front wheel of the group is slightly above the second one (to its rear) so that only the second one contacts hard surfaces and both contact soft surfaces, the front one being particularly useful to pack snow, and preferably with the third and rear wheel slightly above the second one also.

Secondary features reside in the interchangeable front end for wheels and skis, and in special access for snow removal.

In the drawings:

FIG. 1 is a front perspective view of the novel vehicle, showing skis mounted on the front end;

FIG. 2 is a front perspective view of the novel vehicle, with wheels mounted on the front end;

FIG. 3 is a partial side elevational view of the main drive assembly of the vehicle;

FIG. 4 is a rear elevational view of the assembly in FIG. 3;

FIG. 5 is a fragmentary perspective view of the rear portion of the vehicle, showing the snow removal feature;

FIG. 6 is a plan view of the vehicle in FIGS. 1 and 2, with the body cover members removed to show the frame and drive assembly; and FIG. 7 is a front elevational view of the steering assembly and wheel to ski interchangeability feature.

*Description*

Referring to the drawings, the complete vehicle assembly 10 includes a basic elongated framework 12, front end support and steering mechanism 14, motor drive means 16, tandem axle three-wheel drive means 18 of a special sort, cover body means 20, and passenger support means 22.

The framework 12 is an inverted U-shaped rigid elongated structure formed from elongated stock, preferably of square tubular type. It preferably has a pair of parallel upper elongated members 30 on opposite sides of the vehicle, interconnected by a plurality of transverse upper brace bars 32a, 32b, 32c, 32d, and 32e to form an upper generally planar portion forming the cross leg of the elongated inverted U. This upper structure is connected to a pair of lower parallel elongated support members 34 by vertically extending columns 36. A pair of laterally projecting supports 38 support running board panels 40.

The lower ends of the depending side panel portions of the frame structure are tied together, to prevent them from spreading apart, by the three axle units 46, 48 and 50 which will be described in detail hereinafter.

The power motor means 16 may comprise any suitable internal combustion engine, mounted to the front end of the frame structure adjacent the front steering assembly 14. It includes a suitable clutch and/or gear box assembly of conventional type to drive the first elongated continuous recirculatory drive member 52 which preferably is a roller chain. This roller chain extends from output sprocket 54 of the drive clutch gear box assembly to a sprocket 56 mounted on the hub of the front wheel 58. The oversized (in width) drive wheel and cleated tire 58 is mounted on front axle 46. Preferably the width is almost as great as the diameter. A second sprocket 62 is mounted on the opposite hub of wheel 58. It has a second roller chain 64 extending therearound and projecting back around a sprocket 66 on the hub of the middle wheel 86.

Wheel 86 has another sprocket 70 on its oposite side, with a third roller chain 72 extending therearound and projecting back around a sprocket 74 mounted to the hub of the rear wheel 88. To control the tightness of the roller chains, a first vertically adjustable chain tightener, shown in the form of an idler sprocket 80, is mounted to one of the support members 34 (FIG. 3) to engage chain 64, while a second chain tightner 82 is mounted on an opposite side of the assembly, to engage chain 72. These chain tighteners are purposely positioned above the lower frame members in order to be up out of the snow or other material which the vehicle is traversing. Hence, they do not become clogged with the surface material. These tighteners may be Teflon or nylon blocks rather than sprockets.

Axles 46, 48 and 50 are fixedly bolted to the frame (FIG. 3) to effect an advantageous box-type support structure. They extend through the wheels, which are rotationally mounted thereon.

An important feature of this vehicle is the particular arrangement of the three axle assemblies in order to obtain a certain specific relationship between the three wheels. That is, front wheel 58, mounted on axle 46, has a certain relationship with center wheel 86 mounted on axle 48 and with rear wheel 88 mounted on axle 50. The relationship is the vertical height variation between the lower surfaces of these three wheels with respect to the plane containing the lower surface of the center wheel 86 and the lower surface of the front ski members or front wheel members. More specifically, the lower surface of front wheel 58 is set at a small height above the lower surface of the center wheel, preferably about one inch. This may be achieved by having a pair of bearing blocks 88 on the front wheel mounting axle 46 at a height slightly above the height of axle 48 supported by bearing blocks 90. When the vehicle operates in relatively soft consistency material such as snow or mud, the front wheel will provide partial traction and support. Moreover, in snow, front wheel 58 will tend to pack the snow to create better traction for the other two wheels. The front surface actually bears about 10% of the load on the average. Yet, when the wheel vehicle traverses a hard surface, only center wheel 86 engages the surface, as well as the front end steering and support means, so that the vehicle can be turned very readily and with complete ease, requiring no tilting.

The arrangement of rear wheel 88 is also important with respect to center wheel 86. Specifically, the rear wheel is elevated on its bearing blocks 92 so that its lower surface is elevated a fraction of an inch, usually about ⅜ to ½ inch above the lower surface of the center wheel 86. Hence, the rear wheel provides supplemental support and propulsion in any soft consistency materials, e.g. when traversing snow, sand, mud or the like. However, when the vehicle is traversing a hard surface, the rear wheel, like the front wheel, is out of contact with the surface, so that only the center wheel of the axle assembly engages the ground, allowing easy steering and minimum wear. It will be realized that conceivably the controlled vertical positioning of the lower surfaces of the three wheels may be obtained by employing smaller diameter front and rear wheels, with the axles of all three being mounted in a plane. The important feature is to cause only limited surface contact of the tandem axle multiple wheel assemblies during traversing of hard surfaces, for easy steering and minimum wear due to lateral sliding action during turning, and yet to have the entire three axle multiple wheel assembly automatically engaging when in soft consistency material.

Experimental operations of the unit with conventional units has proven its superiority in the noted characteristics. The vehicle with the wheels as shown will accommodate most surfaces desired to be traversed. Of course, if the unit is used in snow or on other low friction surfaces such as ice, the skis are employed at the front end, while if used on high friction surfaces, wheels are used on the front end, these being interchangeable in a manner to be described hereinafter.

Sometimes, in very loose powder snow, it may be desired to employ a belt or cleat track 98 as shown in phantom in FIG. 3, extending around the wheels. This may be installed by extending the belt around the wheels and connecting the two ends of the belt in conventional manner, as with a pin. Even if this is done, the advantages of the equipment exist in minimizing surface contact area on the hard surfaces, while maximizing traction and support surface, since the belt follows the contour and the vertical arrangement of the wheels as shown by the phantom line in FIG. 3. Thus, on hard surfaces, only the center area of the belt beneath center wheel 86 is in engagement with the surface, while, in softer consistency materials, the front portion of the belt serves as packing means as well as support and propulsion means, and the rear portion of the belt on wheel 88 provides partial support and propulsion. Furthermore, the belt need not run around small 7" or so hubs as is necessary in conventional units, but can extend around the entire wheels which may be about 16" in diameter for example. Thus, belt wear is further minimized.

Another feature which makes the novel vehicle advantageous is the removability of the packed snow, ice, mud, or other debris which might be carried up the wheels or belt to the space between the top of the wheels and the bottom of the vehicle. The frame structure beneath the passenger support seat member 22 is purposely of an open type construction, including only cross braces 32a through 32e. The seat 22 is moreover elevatable from the frame structure, preferably by hingedly supporting its front end to brace 32d with hinges 102. Thus, it can be lifted to the elevated position shown in FIG. 5 to allow complete access to the top portion of the drive wheel assembly for single and complete removal of many materials packed in this area.

Another feature believed novel with this vehicular structure is the particular structure enabling interchangeability of the skis and wheels, variously shown in FIGS. 1, 2 and 6, for the front end support and steering assembly. The structure illustrated in FIG. 7 enables front wheels 110 to be interchanged with front skis 112 without even tipping the vehicle up on its side. This is done by interchanging fittings which cooperate with the pair of horizontal cylindrical hollow collars 116.

More specifically, if wheels are to be mounted, an interconnected wheel and axle assembly including a wheel 110 and its axle 120 is mounted to collar 116 by sliding axle 120 into the collar and inserting a transverse drive pin 122 through both to pin them together. If skis are to be mounted, the wheel and axle unit on each side is removed by removing pin 122 and sliding out axle 120, and positioning a ski 112 with its pair of upstanding support flanges 122 (mounted to a mounting plate 122') such that flanges 122 straddle the ends of collar 116 (FIG. 1). Then by inserting a lock bar 124 the same size as axle 120, i.e. interfitting closely with collar 116, and inserting drive pin 122 through the two, the assembly is fixed in position. The collar and the remainder of the interconnected structure shown in FIG. 7 is a stationary part of the equipment. Collar 116 is mounted to a vertical shaft 130, reinforced by diagonal supports 132, with shaft 130 projecting up through sleeve 134 and retained by cotter keys 133. Sleeve 134 is vertically oriented and secured to a cross beam 136. This cross beam is mounted to the front of the frame, adjacent support 32e, as shown in FIG. 6. Steering is accomplished by rotating shaft 130 with a tie rod assembly including tie rods 140 interconnected by ball joint 142 to a radius arm 144 secured to shaft 130. The opposite end of the tie rod is mounted to a collar 148 secured to a swivel joint 150. The swivel joint is eccentric with respect to the vertically extending steering shaft 152, and secured thereto so that with rotation of steering shaft 152 inside its fixed cylinder 154, both collars 148 will be caused to move in an arc on opposite sides of the steering shaft. This pulls tie rods 140 toward the center, or alternately extend them further outwardly, for rotating shafts 130, to thereby pivot the wheels or skis for a turning action.

Preferably, the wheel and axle assemblies project further out laterally of the vehicle to provide added stability, while the skis can be positioned more closely together, i.e. beneath collars 130, since they provide more support area. Secured to the top end of steering shaft 152 is a suitable pair of handlebars 160 or an equivalent steering wheel unit as desired.

The rear portion of the frame may be covered with a suitable cover panel 101 if desired, behind the seat 22, and may include a carriage rack 103 thereon.

The operation of the equipment will be generally understood from the description given above. Briefly, with the engine assembly 16 controllably driving the wheels through the interconnected roller chain, sprocket, and axle units, when wheels are employed on the front steering assembly, and no belt is employed, the front wheel of the tandem axle assembly compacts and provides partial propulsion and support, while the center wheel bears most of the load and provides the main propulsion. The rear wheel provides supplemental load support and propulsion in soft materials. When the unit is driving over a hard surface, only the center wheel engages the ground so that steering is easily achieved, and no wear occurs on the front and rear tires as would occur if they were in sliding engagement with the surface. The same factors result when a belt is extended around the tires.

It is conceivable that various modifications of this structure may be made within the novel concept presented herein. For example, a fourth wheel could be added to the three shown, but this would normally only be superfluous and unnecessary.

I claim:

1. A vehicle for travelling over soft material and hard material surfaces including vehicle framework support means forming a front end portion and an extended portion therebehind and having transversely spaced parallel side members, a steerable surface contacting and traversing means at said front end portion, and power motor means, the improvement comprising: tandem axle vehicle support and propulsion means at said extended portion, including three wheel and axle assemblies, means drivingly connecting one of said assemblies with said power motor means and further means drivingly interconnecting the remaining two of said assemblies with each other and with said one of said assemblies, each said assembly having only one tire, the tread width of which is substantially equal to that of the diameter and extends substantially the transverse spaced width of said side members, means mounting the front and rear two of said wheel and axle assemblies with their surface contacting underside elevated sufficiently above the surface contacting underside of the third such that when the vehicle travels over a soft material surface all three tires operably engage said soft surface material and when said vehicle travels over a hard material surface only the third middle wheel operably engages said hard surface material.

2. The vehicle in claim 1 wherein the surface contacting underside of said steerable surface contacting and traversing means and said surface contacting underside of said middle assembly are in the same plane, the surface contacting underside of said front assembly is generally about one inch above said plane, and the surface contacting underside of said rear assembly is generally about three eighths to one-half inch above said plane.

3. The vehicle in claim 1 including endless belt type track means extending around said three assemblies.

4. A surface vehicle comprising: an inverted, generally U-shaped elongated frame; steerable surface contacting and traversing means at one end of said frame; power motor means mounted on said frame; a plurality of tandemly arranged wheel and axle assemblies along said frame including a plurality of parallel axles extending between and mounted to the lower end of the depending legs of said inverted generally U-shaped frame to box-in the frame and serve as frame reinforcing means; and drive connection means between said power motor means and said assemblies; said plurality of assemblies comprising three such assemblies, tandemly arranged front, middle, and rear, with said front assembly and said rear assembly being mounted and arranged with their surface contacting undersides elevated sufficiently above the surface contacting underside of said middle assembly that all three engage soft surface materials and only said middle one generally engages hard surface material; said frame having elongated lower edge portions along said depending legs; and said drive connection means including endless roller chain means, drive sprocket means connected to said power motor means, a plurality of driven sprockets on said assemblies, and a plurality of chain tighteners mounted to said frame and positioned vertically above said frame lower edge portions to be protected.

5. A surface vehicle including vehicle framework support means forming a front end portion and an extended portion therebehind, steerable surface contacting and traversing means at said front end portion, and power motor means, the improvement comprising: tandem axle vehicle support and propulsion means at said extended portion, including at least three wheel and axle assemblies drivingly connected with said power motor means, said framework support means defining snow removal access opening means above said wheel and axle assemblies; and personnel supporting seat means resting upon said framework support means and shiftable between a first position covering said access opening and a second position uncovering said access opening.

References Cited

UNITED STATES PATENTS

| | | | |
|---|---|---|---|
| 2,141,530 | 12/1938 | Guidroz | 180—9.38 |
| 2,824,592 | 2/1958 | Neisler et al. | |
| 2,906,358 | 9/1959 | Tucker | 180—23 |
| 2,925,873 | 2/1960 | LaPorte | 180—5 |
| 3,011,576 | 12/1961 | Howes | 180—5 |
| 3,023,826 | 3/1962 | Larson et al. | 180—23 |

FOREIGN PATENTS 986,197   3/1951   France.

A. HARRY LEVY, *Primary Examiner.*

U.S. Cl. X.R.

180—9.26, 9.38, 22, 25; 280—95